(12) United States Patent
Uemura

(10) Patent No.: US 10,182,188 B2
(45) Date of Patent: Jan. 15, 2019

(54) IMAGE PICKUP APPARATUS THAT AUTOMATICALLY ADJUSTS BLACK BALANCE, CONTROL METHOD THEREFOR, AND STORAGE MEDIUM

(71) Applicant: CANON KABUSHIKI KAISHA, Tokyo (JP)

(72) Inventor: Hidetaka Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/078,108

(22) Filed: Mar. 23, 2016

(65) Prior Publication Data

US 2016/0286112 A1    Sep. 29, 2016

(30) Foreign Application Priority Data

Mar. 27, 2015    (JP) ................................ 2015-066655

(51) Int. Cl.
*H04N 5/235* (2006.01)
*H04N 17/00* (2006.01)

(52) U.S. Cl.
CPC ......... *H04N 5/2351* (2013.01); *H04N 5/2352* (2013.01); *H04N 17/002* (2013.01)

(58) Field of Classification Search
CPC ........ G02B 5/205; G02B 26/023; G03B 7/18; H04N 5/238; H04N 5/2351; H04N 5/2352; H04N 17/002; H04N 5/165; H04N 5/18; H04N 5/185; G09G 2320/0238
USPC ... 348/223.1, 224.1, 229.1, 175, 187, 221.1, 348/362, 208.12, 379, 655, E5.07, 348/E5.072, E9.051, 360, 361; 396/63, 396/65, 89, 155, 157, 161, 166, 167, 180, 396/215, 241; 250/204, 208.1; 359/888
See application file for complete search history.

(56) References Cited

U.S. PATENT DOCUMENTS

| | | | | |
|---|---|---|---|---|
| 5,999,213 | A * | 12/1999 | Tsushima ................ | H04N 5/232 348/223 |
| 7,199,830 | B1 * | 4/2007 | Tanaka ..................... | G03B 7/08 348/362 |
| 7,609,320 | B2 * | 10/2009 | Okamura ................ | H04N 5/235 348/221.1 |

(Continued)

FOREIGN PATENT DOCUMENTS

JP    2013098590 A    5/2013

*Primary Examiner* — Tuan Ho
*Assistant Examiner* — Marly Camargo
(74) *Attorney, Agent, or Firm* — Rossi, Kimms & McDowell LLP

(57) ABSTRACT

An image pickup apparatus which is capable of performing automatic adjustment of black balance properly without the need to have a member for fully shielding light. A diaphragm of a lens barrel and an ND filter, which is provided separately from the diaphragm, adjust the amount of light incident on an image pickup device that picks up an image of a subject. Whether the automatic adjustment is possible in present image pickup environment is judged based on evaluation values of a picked-up image obtained in a state where the amounts of incident light are maximized by respective ones of the diaphragm and the ND filter, and a predetermined judgment threshold value which is determined based on a range over which the amount of incident light is adjustable by the diaphragm and a range over which the amount of incident light is adjustable by the ND filter.

12 Claims, 8 Drawing Sheets

(56) References Cited

U.S. PATENT DOCUMENTS

| | | | | |
|---|---|---|---|---|
| 7,920,782 B2* | 4/2011 | Fujii | ............ | G03B 13/32 |
| | | | | 396/114 |
| 8,355,059 B2* | 1/2013 | Fukui | ............ | H04N 5/23219 |
| | | | | 348/229.1 |
| 2002/0033764 A1* | 3/2002 | Graen | ............ | H04N 5/185 |
| | | | | 341/155 |
| 2002/0122119 A1* | 9/2002 | Takakura | ............ | H04N 9/735 |
| | | | | 348/223.1 |
| 2006/0044424 A1* | 3/2006 | Shirai | ............ | H04N 5/3658 |
| | | | | 348/241 |
| 2006/0256214 A1* | 11/2006 | MacLean | ............ | G03B 17/48 |
| | | | | 348/234 |
| 2008/0284872 A1* | 11/2008 | Asoma | ............ | H04N 5/2355 |
| | | | | 348/229.1 |
| 2010/0039414 A1* | 2/2010 | Bell | ............ | G09G 3/20 |
| | | | | 345/207 |
| 2011/0019037 A1* | 1/2011 | Mizuhara | ............ | H04N 5/361 |
| | | | | 348/243 |
| 2012/0050567 A1* | 3/2012 | Cote | ............ | H04N 9/68 |
| | | | | 348/224.1 |
| 2014/0152844 A1* | 6/2014 | Jiang | ............ | H04N 17/002 |
| | | | | 348/187 |

* cited by examiner

*FIG. 4*

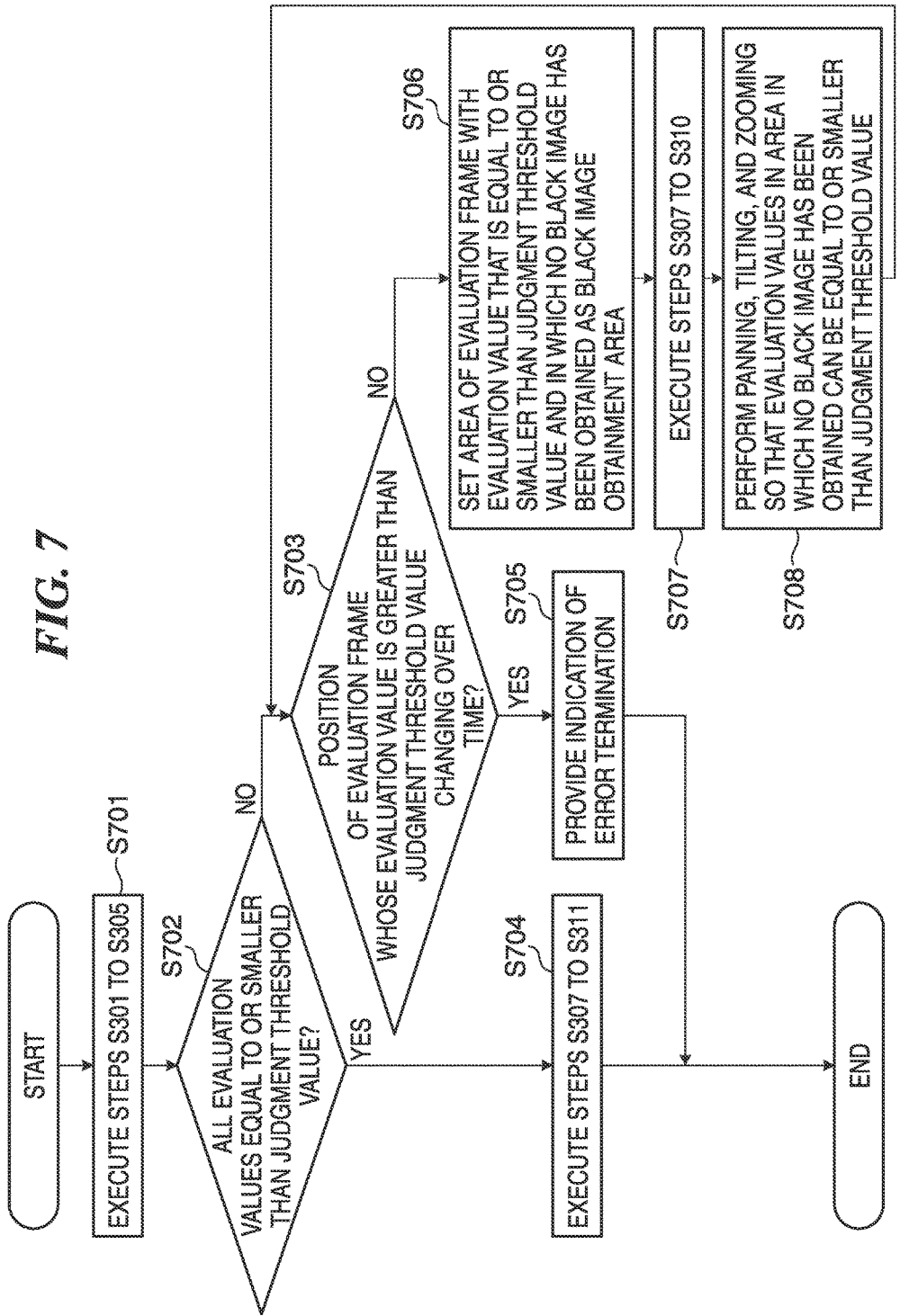

IMAGE PICKUP APPARATUS THAT AUTOMATICALLY ADJUSTS BLACK BALANCE, CONTROL METHOD THEREFOR, AND STORAGE MEDIUM

BACKGROUND OF THE INVENTION

Field of the Invention

The present invention relates to an image pickup apparatus, a control method therefor, and a storage medium.

Description of the Related Art

Some image pickup apparatuses such as video cameras for professional use have a function of automatically adjusting black balance so as to fix defective pixels that appear later due to black level adjustments, cosmic radiation, or the like in a usage environment. By adjusting black balance, deviations of black level which occur with changes in the temperature of an image pickup device (image sensor), and defective pixels which appear later are corrected for. However, for an interchangeable-lens camera lens system, there are many interchangeable lenses which have a diaphragm which cannot fully shield light because of its mechanical structure. In a camera system equipped with such an interchangeable lens, the interchangeable lens is removed temporarily to mount a body cap on a camera main body so as to fully shield light, and black balance is automatically adjusted.

A technique to judge whether or not it is possible to properly perform automatic adjustment of black balance is described in, for example, Japanese Laid-Open Patent Publication (Kokai) No. 2013-98590. According to the technique described in Japanese Laid-Open Patent Publication (Kokai) No. 2013-98590, black balance is automatically adjusted on the condition that a luminance obtained in a state where the rate of darkening by a darkening action of a darkening member, which reduces the amount of light incident on an image pickup device, is controlled so as not to be the highest is equal to or smaller than a predetermined luminance value.

However, according to the technique described in Japanese Laid-Open Patent Publication (Kokai) No. 2013-98590, black balance is automatically adjusted on the precondition that light is fully shielded, and hence a problem arises because an adjustment error occurs when light cannot be fully shielded. For example, an indoor camera with a head, which is used, for example, for surveillance or at a bridal, is often placed at a high place, and it is thus uneasy for a user to mount a body cap on the camera. Thus, light cannot be fully shielded sometimes, making it impossible to automatically adjust black balance. Also, many indoor cameras with a head have no camera case, and hence an approach of providing a camera case with a light-shielding means cannot be taken, and moreover, due to flange back constraints, a camera main body often has no space where a member for use in fully shielding light is provided.

SUMMARY OF THE INVENTION

The present invention provides an image pickup apparatus which is capable of performing automatic adjustment of black balance properly based on environmental light without the need to have a member for fully shielding light.

Accordingly, the present invention provides an image pickup apparatus comprising an image pickup unit configured to pick up an image of a subject, a first adjustment unit configured to adjust an amount of light incident on the image pickup unit, a second adjustment unit configured to be provided separately from the first adjustment unit and adjust an amount of light incident on the image pickup unit, a judgment unit configured to judge whether automatic adjustment of black balance is possible in a present image pickup environment based on evaluation values of a picked-up image obtained in a state where the amounts of incident light are maximized by respective ones of the first adjustment unit and the second adjustment unit, and a predetermined judgment threshold value, and a determination unit configured to determine the judgment threshold value based on a range over which the amount of incident light is adjustable by the first adjustment unit and a range over which the amount of incident light is adjustable by the second adjustment unit.

According to the present invention, even in a situation where, for example, mounting of a body cap or the like which fully shields light is impossible, automatic adjustment of black balance is properly performed as long as black balance adjustment is possible in the present image pickup environment.

Further features of the present invention will become apparent from the following description of exemplary embodiments (with reference to the attached drawings).

BRIEF DESCRIPTION OF THE DRAWINGS

FIG. 4 is a diagram schematically showing evaluation frames for judgment of an image pickup environment, which are used in step S305 in the flowchart of FIG. 3.

FIG. 7 is a flowchart showing the procedure of an automatic black balance adjustment process according to a third embodiment which is carried out by the video camera in FIGS. 1A to 1C.

DESCRIPTION OF THE EMBODIMENTS

Hereafter, an embodiment of the present invention will be described in detail with reference to the drawings. Here, what is called a digital video camera (hereafter referred to as a "video camera") is taken as an example of an image pickup apparatus according to the present invention. The present invention, however, should not be limited to a video camera but may be applied to a digital still camera as well. It should be noted that in the following description, automatic adjustment of black balance (automatic black balance adjustment) in a video camera will be referred to as "ABB adjustment".

Figure 1A:
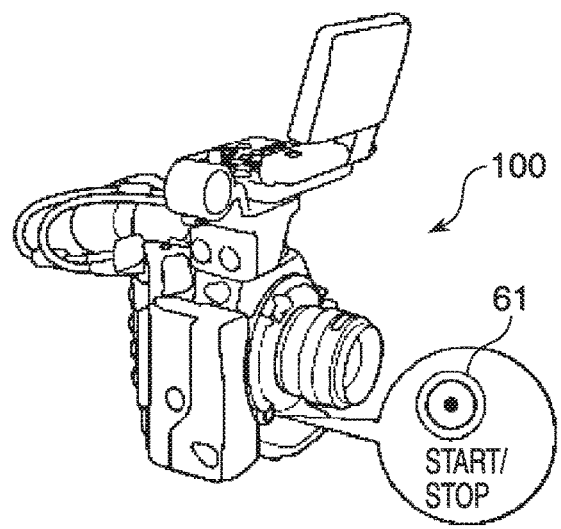
FIGS. 1A to 1C are perspective views showing an appearance of a video camera according to an embodiment of the present invention.
Figure 1B:
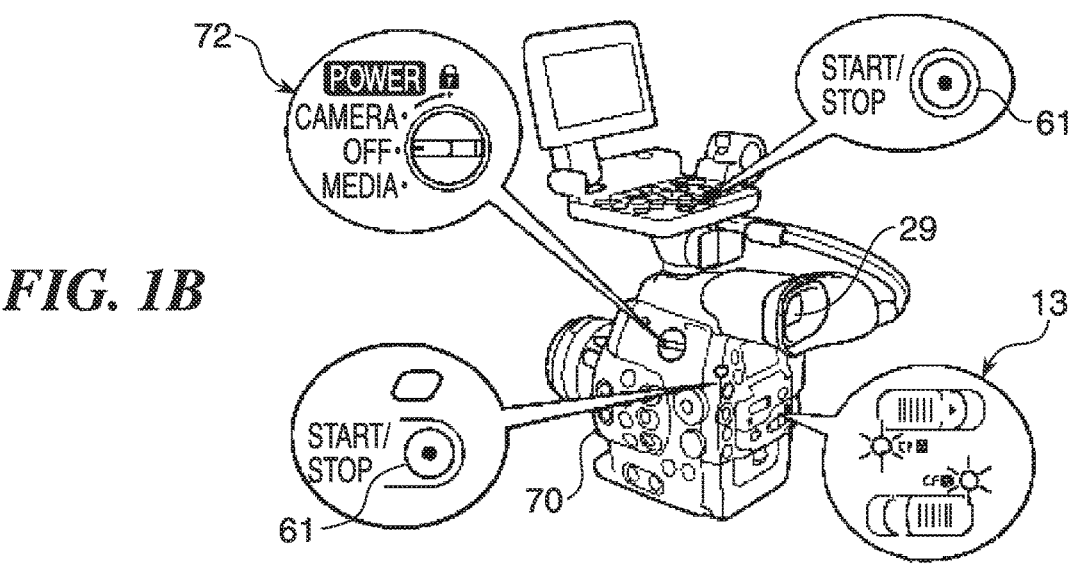
Figure 1C:
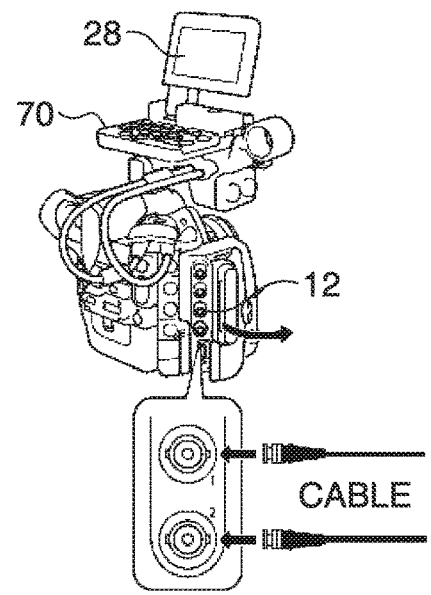

FIGS. 1A to 1C are perspective views showing an appearance of a video camera 100 according to the embodiment of the present invention, and they are drawn from different points of views. The video camera 100, which is an interchangeable-lens video camera with a removable interchangeable lens, has a connector 12, an access lamp 13, a monitor 28, a finder 29, a trigger button 61, an operating panel 70, and a power/mode switch 72.

Images and a variety of information are displayed on the monitor 28 and the finder 29. The trigger button 61 is an operating button for issuing an image pickup instruction. The power/mode switch 72 is an operating button for selectively turn on and off the power and switching between an image pickup mode and a reproducing mode. The operating panel 70 is comprised of a variety of switches, buttons, and so forth which receive a variety of operations from a user. The connector 12 outputs video signals from the video camera 100 to an external monitor and an external storage device. The access lamp 13 indicates status conditions of a card slot for storing image data.

Figure 2:
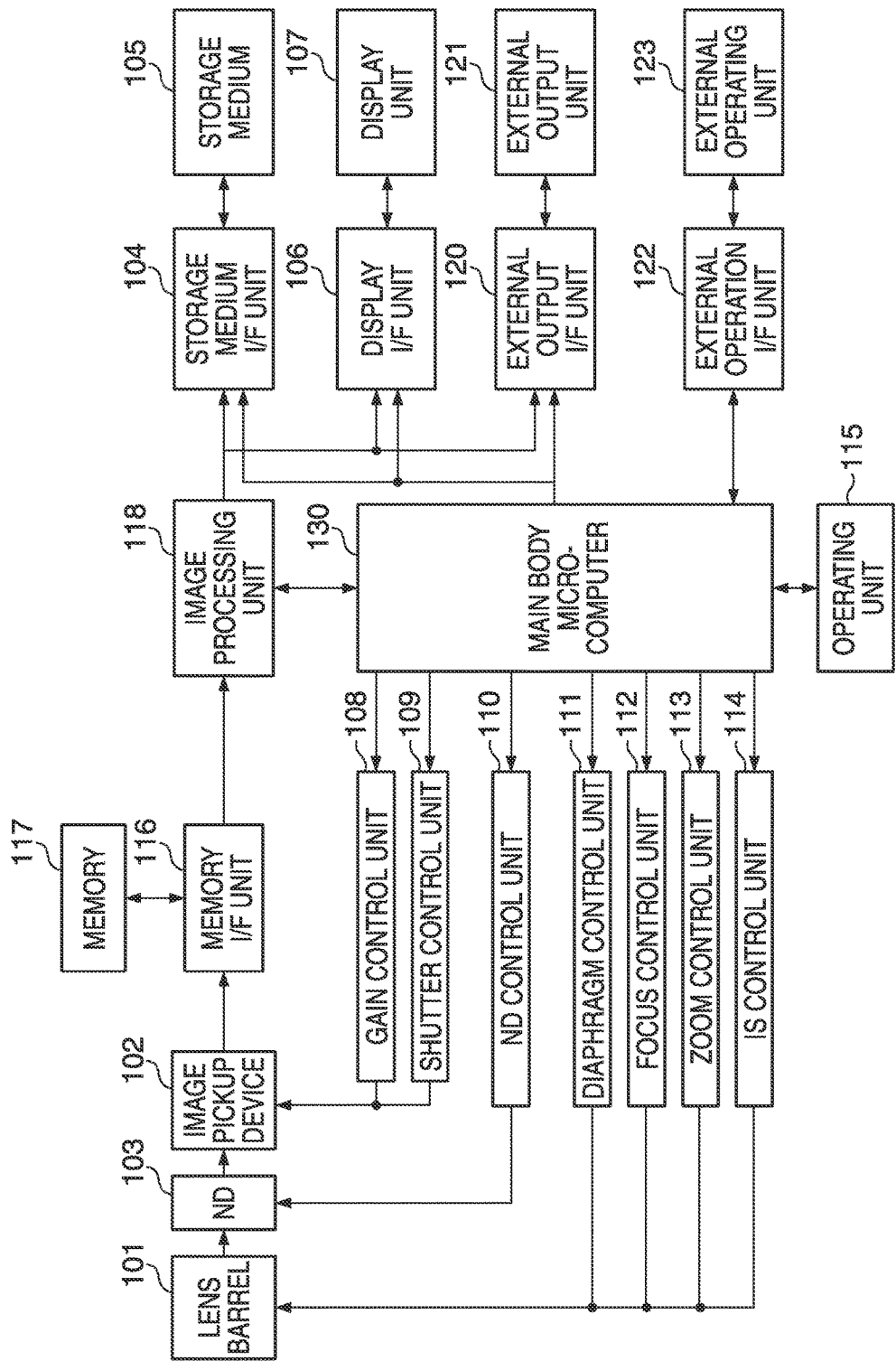
FIG. 2 is a block diagram schematically showing an arrangement of the video camera in FIGS. 1A to 1C.

FIG. 2 is a block diagram schematically showing an arrangement of the video camera 100. Function blocks (a variety of control units and processing units) in FIG. 2 may be implemented by hardware such as ASICs and programmable logic arrays (PLA) or implemented by a programmable processor such as a CPU or an MPU executing software. The function blocks may be implemented by a combination of hardware and software as well.

The video camera 100 is comprised of a lens barrel 101, an image pickup device 102, an ND (natural density) filter 103, a storage medium I/F unit 104, a storage medium 105, a display I/F unit 106, and a display unit 107. The video camera 100 is comprised of a gain control unit 108, a shutter control unit 109, an ND control unit 110, a diaphragm control unit 111, a focus control unit 112, a zoom control unit 113, a vibration isolation control unit (IS control unit) 114, a memory I/F unit 116, a memory 117, and an image processing unit 118. The video camera 100 also has an operating unit 115, an external output I/F unit 120, an external output unit 121, an external operation I/F unit 122, an external operating unit 123, and a main body microcomputer 130.

The lens barrel 101 is an interchangeable lens barrel removable from a camera main body of the video camera 100. The lens barrel 101 has a group of various lenses such as a focus lens, a zoom lens, and a shift lens, and a diaphragm (first adjustment unit) which adjusts the amount of light incident on the image pickup device 102. The image pickup device 102 is a CCD image sensor, a CMOS image sensor, or the like. An optical image of a subject which is formed on the image pickup device 102 through the lens barrel 101 is photoelectrically converted by the image pickup device 102 to generate analog electric signals, which in turn are converted into image signals which are digital signals by an A/D conversion circuit.

The pixel-by-pixel image signals thus generated (RAW image data) are output to the memory I/F unit 116. It should be noted that pixel signals output from the image pickup device 102 include not only pixel signals in an effective image area indicative of the signal intensity of a subject optical image but also include pixel signals in an OB area which is for use in eliminating noise from pixel signals output from the image pickup device 102 and carrying out a correction process such as a clamping process.

The ND filter 103 (second adjustment unit) is incorporated in the camera body separately from the diaphragm, which is provided in the lens barrel 101, so as to adjust the amount of light incident on the image pickup device 102. The image processing unit 118 corrects for a level difference caused by the image pickup device 102. For example, the image processing unit 118 corrects for levels of pixel signals in an effective area using pixel signals in an OB area and also fixes a defective pixel using pixel signals around it. Further, the image processing unit 118 carries out such processes as correction for light falloff at edges, color correction, edge enhancement, noise elimination, gamma correction, debayer, and compression. The image processing unit 118 carries out these processes on RAW image data input from the image pickup device 102 and outputs the processed image data to a predetermined control unit.

The storage medium I/F unit 104, which is an interface between the storage medium 105 and the video camera 100, provides control to store image data, which is obtained from the image processing unit 118, in the storage medium 105, and conversely, read out the stored image data from the storage medium 105. The storage medium 105 is, for example, a semiconductor memory which stores image data on a picked-up image, and under the control of the storage medium I/F unit 104, stores image data and reads out stored image data.

The display unit 107 includes the monitor 28 and the finder 29 which display image data output from the display I/F unit 106 so that it can be used to check the angle of view. Also, a variety of information on the video camera 100 is allowed to be displayed on the display unit 107. It should be noted that the access lamp 13 is included in the display unit 107.

The main body microcomputer 130 calculates a luminance level from image data output from the image processing unit 118. The main body microcomputer 130 calculates a value of a gain, which is to be applied inside the image pickup device 102, based on the calculated luminance level and supplies the calculation result to the gain control unit 108. The gain control unit 108 controls the gain of the image pickup device 102 in accordance with an instruction from the main body microcomputer 130. The main body microcomputer 130 calculates a value of a shutter speed, which should be set for the image pickup device 102, based on the calculated luminance level and supplies the calculation result to the shutter control unit 109. The shutter control unit 109 controls the shutter speed of the image pickup device 102 in accordance with an instruction from the main body microcomputer 130.

The main body microcomputer 130 calculates a value of an aperture, which should be set for the lens barrel 101, based on the calculated luminance level and supplies the calculation result to the diaphragm control unit 111. The diaphragm control unit 111 controls the aperture of the lens barrel 101 in accordance with an instruction from the main body microcomputer 130. The main body microcomputer 130 calculates a value of the ND filter 103, which should be set for the lens barrel 101, based on the calculated luminance level and supplies the calculation result to the ND control unit 110. The ND control unit 110 controls the amount of light incident on the image pickup device 102 through the ND filter 103 in accordance with an instruction from the main body microcomputer 130. Based on the calculated luminance level, the main body microcomputer 130 calculates focusing information required to drive the focus lens and supplies the calculation result to the focus control unit 112. The focus control unit 112 controls the operation of the focus lens (position in a direction of an optical axis), which is provided inside the lens barrel 101, in accordance with an instruction from the main body microcomputer 130.

The zoom control unit 113 controls the operation of the zoom lens, which is provided inside the lens barrel 101, in accordance with focal length information or the like input from the operating unit 115 or input from the external operating unit 123 via the external operation I/F unit 122. The main body microcomputer 130 calculates a motion vector of a subject based on image data output from the image processing unit 118 and supplies the calculation result to the vibration isolation control unit 114. The vibration isolation control unit 114 controls the operation of the shift lens, which is provided inside the lens barrel 101, so as to compensate for camera shake in accordance with an instruction from the main body microcomputer 130. It should be noted that the vibration isolation control unit 114 may be configured to carry out an electronic vibration isolation process, in which images are cut from respective frames of a moving picture so as to compensate for image blur caused by camera shake, in lieu of the above optical vibration isolation process.

The operating unit 115 is comprised of buttons, switches, a panel, and so forth which are objects to be operated by the user and includes the power/mode switch 72, the trigger button 61, and the operating panel 70 described above. When the user issues an image pickup instruction, an ABB adjusting instruction, a focal length adjusting instruction, or the like through operation on the operating unit 115, the main body microcomputer 130 is notified of this instruction.

The memory I/F unit 116 is an interface which writes RAW image data of all pixels, which is output from the image pickup device 102, into the memory 117 and also reads out RAW image data held in the memory 117 and outputs the RAW image data to the image processing unit 118. The memory 117 is a volatile storage medium capable of storing RAW image data of all pixels in several frames.

The image processing unit 118 subjects RAW image data of all pixels, which is obtained through the memory I/F unit 116, to image processing required for control. The image data processed by the image processing unit 118 is sent to the main body microcomputer 130, which in turn computes control amounts for control units based on the obtained image data. The external output I/F unit 120 is an interface for outputting image data, which is output from the image processing unit 118, to an external display monitor and a storage medium. It should be noted that the connector 12 in FIG. 1C is included in the external output I/F unit 120.

The main body microcomputer 130 has a CPU, a ROM, a RAM, and so forth, and the CPU expands programs, which are stored in the ROM, in a work area of the RAM to control the overall operation of the video camera 100. The main body microcomputer 130 also executes programs, which are stored in the ROM, to implement processes in embodiments described later. The RAM has a storage area in which constants and variations for use in a variety of controls, image data obtained from the image processing unit 118 and results of computation by the CPU are temporarily stored, as well as the work area for programs. Further, the main body microcomputer 130 carries out a variety of processes in accordance with instructions input to the operating unit 115.

A description will now be given of ABB adjustment control in the camera 100, which is a control method for the image pickup apparatus according to the present invention.

In a first embodiment, a threshold value (hereafter referred to as a "judgment threshold value") of environmental light that makes ABB adjustment possible in a state equivalent to a fully light-shielded state is determined based on a range over which the amount of incident light is adjustable by the diaphragm and a range over which the amount of incident light is adjustable by the ND filter 103. Based on the determined judgment threshold value, whether or not ABB adjustment is possible in the present image pickup environment is automatically determined. It should be noted that the range over which the amount of incident light is adjustable by the diaphragm corresponds to a range over which the diaphragm of the lens barrel 101 is allowed to be actuated, and the range over which the amount of incident light is adjustable by the ND filter 103 corresponds to a range of density changeable by the ND filter 103.

Figure 3:
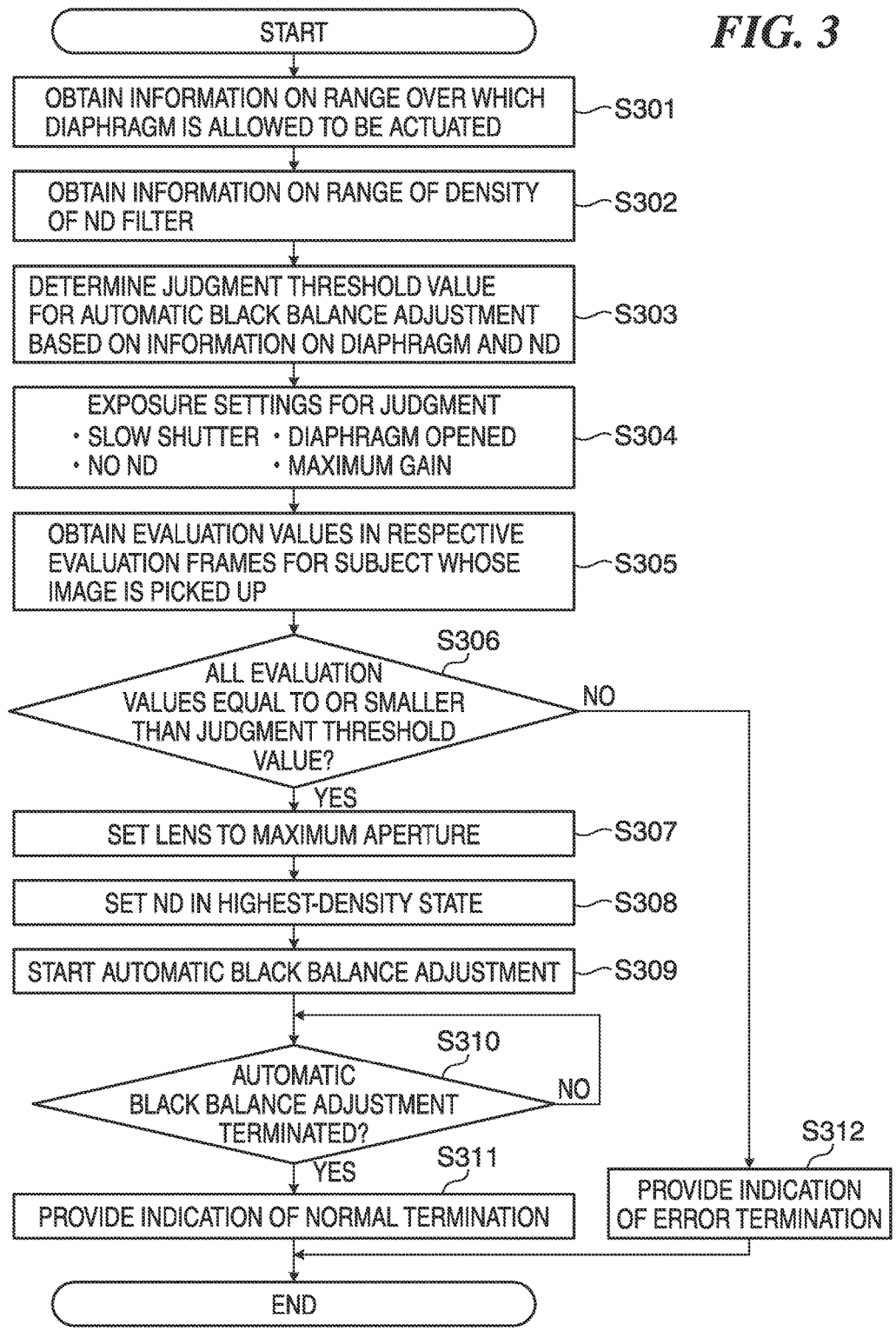
FIG. 3 is a flowchart showing the procedure of an automatic black balance adjustment process according to a first embodiment which is carried out by the video camera in FIGS. 1A to 1C.

FIG. 3 is a flowchart showing the procedure of an ABB adjustment process according to the first embodiment in the video camera 100. In the following description, it is assumed that this process is carried out in response to a user's request for ABB adjustment through menu operation (operation on the operating unit 115).

In response to an ABB adjustment executing instruction from the operating unit 115, the main body microcomputer 130 obtains, in step S301, information on the range over which the diaphragm incorporated in the currently-mounted lens barrel 101 is allowed to be actuated. In step S302, the main body microcomputer 130 obtains information on the range of density changeable by the ND filter 103 incorporated in the camera main body. In step S303, based on the information obtained in the steps S301 and S302, the main body microcomputer 130 determines a judgment threshold value for judging whether or not ABB adjustment is possible. It should be noted that in the present embodiment, luminance values in respective evaluation frames, to be described later, obtained by dividing a picked-up image are used to determine whether or not ABB adjustment is possible, and hence a predetermined luminance value is used as the judgment threshold value.

Then, in step S304, the main body microcomputer 130 configures exposure settings for judging whether or not ABB adjustment is possible in the present image pickup environment. Specifically, a slow shutter speed is set, the diaphragm of the lens barrel 10 is opened, the ND filter 103 is brought into a minimum density state (drawn state), and the gain is set at a maximum value so as to increase sensitivity. This creates a state in which whether or not the image pickup environment is sufficiently dark is judged with high accuracy.

In step S305, the main body microcomputer 130 picks up an image under the exposure conditions set in the step S304, divides an image pickup area of the image pickup device 102 into a plurality of areas, and obtains evaluation values (luminance values) in the respective areas (hereafter referred to as "the evaluation frames"). In step S306, the main body microcomputer 130 judges whether or not all the evaluation values are equal to or smaller than the judgment threshold value. When all the evaluation values obtained in the step S305 are equal to or smaller than the judgment threshold value, the main body microcomputer 130 judges that ABB adjustment is possible in the present image pickup environment, and when any of the evaluation values is greater than the judgment threshold value, the main body microcomputer 130 judges that ABB adjustment is impossible in the present image pickup environment.

When the main body microcomputer 130 judges that at least one of the evaluation values obtained in the step S305 is greater than the judgment threshold value (NO in the step S306), the process proceeds to step S312. In the step S312, the main body microcomputer 130 provides an indication of error termination to the effect that ABB adjustment is impossible and then terminates the present process.

On the other hand, when the main body microcomputer 130 judges that all the evaluation values obtained in the step S305 are equal to or smaller than the judgment threshold value (YES in the step S306), the process proceeds to step S307. In the step S307, the main body microcomputer 130 brings the diaphragm of the lens barrel 101 into a maximum aperture state (aperture is reduced to the greatest extent possible). In step S308, the main body microcomputer 130 brings the ND filter 103 into a maximum density state (state in which the ND filter 103 is inserted to the limit). By thus making the amount of incident light through the diaphragm and the ND filter 103 minimum (that is, a darker image pickup environment), accurate image correction data for ABB adjustment is obtained.

The main body microcomputer 130 starts ABB adjustment in step S309 and then judges in step S310 whether or not ABB adjustment has been completed. It should be noted that a concrete method of ABB adjustment is not limited, and for example, a well-known method as described in Japanese Laid-Open Patent Publication (Kokai) No. 2013-98590 may be used.

Upon judging that ABB adjustment has not been completed (NO in the step S310), the main body microcomputer 130 makes the judgment in the step S310 again after a time period determined in advance has elapsed. On the other hand, when the main body microcomputer 130 judges that ABB adjustment has been completed (YES in the step S310), the process proceeds to step S311. In the step S311, the main body microcomputer 130 provides, on the display unit 107 (the monitor 28), an indication to the effect that ABB adjustment has been normally completed, and terminates the present process. It should be noted that ABB adjustment is normally completed when image correction data for ABB adjustment has been generated for all the pixels of the image pickup device 102.

Figure 4:
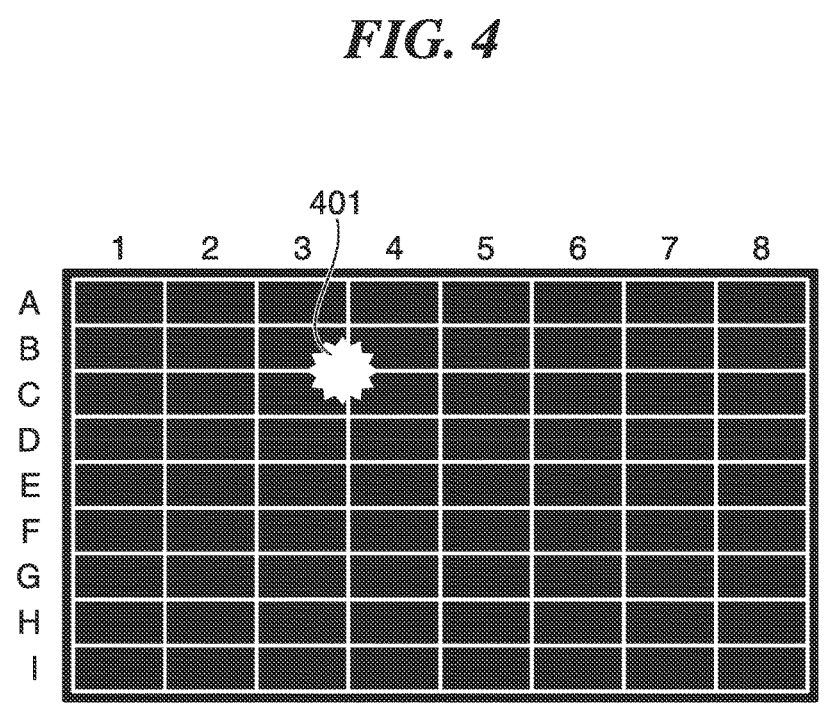

FIG. 4 is a diagram schematically showing evaluation frames for judgment of an image pickup environment, which are used in the step S305. It is assumed here that there are frames of 72 areas consisting of vertical 9 rows and horizontal 8 columns (9 rows×8 columns), and the rows are denoted as A to I, and the columns are denoted as 1 to 8. Thus, an upper left evaluation frame is denoted as A1, and a lower right evaluation frame is denoted as I8.

In an example shown in FIG. 4, a light source 401 lies across evaluation frames B3, B4, C3, and C4. In this case, evaluation values (luminance values) obtained from the evaluation frames B3, B4, C3, and C4 are greater than a judgment threshold value (a luminance value which is a judgment threshold value), and hence it is judged in the step S306 that ABB adjustment is impossible.

As described above, in the present embodiment, a threshold value (judgment threshold value) of environmental light that makes ABB adjustment possible is determined based on a range over which a diaphragm of a mounted interchangeable lens is actuated and a range of density changeable by the camera main body. Then, based on evaluation values in evaluation frames set in a picked-up image and the determined judgment threshold value, whether or not ABB adjustment is possible in the present image pickup environment is automatically judged. As a result, even in a situation where it is impossible for a user to mount a body cap on the lens barrel 101, accurate ABB adjustment is possible as long as ABB adjustment is possible in the present image pickup environment.

It should be noted that in the present embodiment, when an image pickup environment is to be judged, exposure settings are changed to those for judgment. On the other hand, it may be arranged such that whether or not ABB adjustment is possible in the present exposure settings is automatically judged by dynamically calculating a judgment threshold value according to current exposure settings without switching to exposure settings for judgment. Also, it may be arranged such that, whether or not ABB adjustment has been made in an image pickup environment that is surely dark is judged by carrying out the processes in the steps S305 and S306 again after ABB adjustment is completed considering a case where image pickup environment changes during ABB adjustment. For example, in a case where the judgment result in the step S306 turns NO when the processes in the steps S305 and S306 again have been carried out after completion of ABB adjustment, a result of previous ABB adjustment is canceled, and ABB adjustment is started over again. This modification of the arrangement may be applied to a second embodiment and a third embodiment, to be described later, as well.

Further, in the present embodiment, the ND filter 103 is used, but as a substitute for it, an EC device (electro chromic device) may be used. Moreover, even if the camera main body has such a mechanical structure that a plurality of ND filters 103 are allowed to be mounted thereon at the same time, a plurality of ND filters 103 is not usually inserted at the same time from a standpoint of optical path length. On the other hand, in the present embodiment, by inserting a plurality of ND filters 103 at the same time to increase density only at the time of ABB adjustment, a judgment threshold value for an image pickup environment in which ABB adjustment is possible is decreased. In this case, information on a range of density changeable by the ND filters 103 incorporated in the video camera 100 is information in a state where a plurality of ND filters 103 is inserted at the same time. This modification of the arrangement may be applied to the second embodiment and the third embodiment, to be described later, as well.

In the second embodiment, when an evaluation value in an arbitrary evaluation frame is greater than a judgment threshold value, the angle of view at which image pickup is possible is changed by one or more of panning, tilting, and zooming, and after that, whether or not ABB adjustment is possible is automatically judged. It should be noted that among processes in the second embodiment, description of those overlapping the processes in the first embodiment described above is omitted as appropriate, and the following description focuses on processes characteristic to an ABB adjustment method according to the second embodiment.

Figure 5:
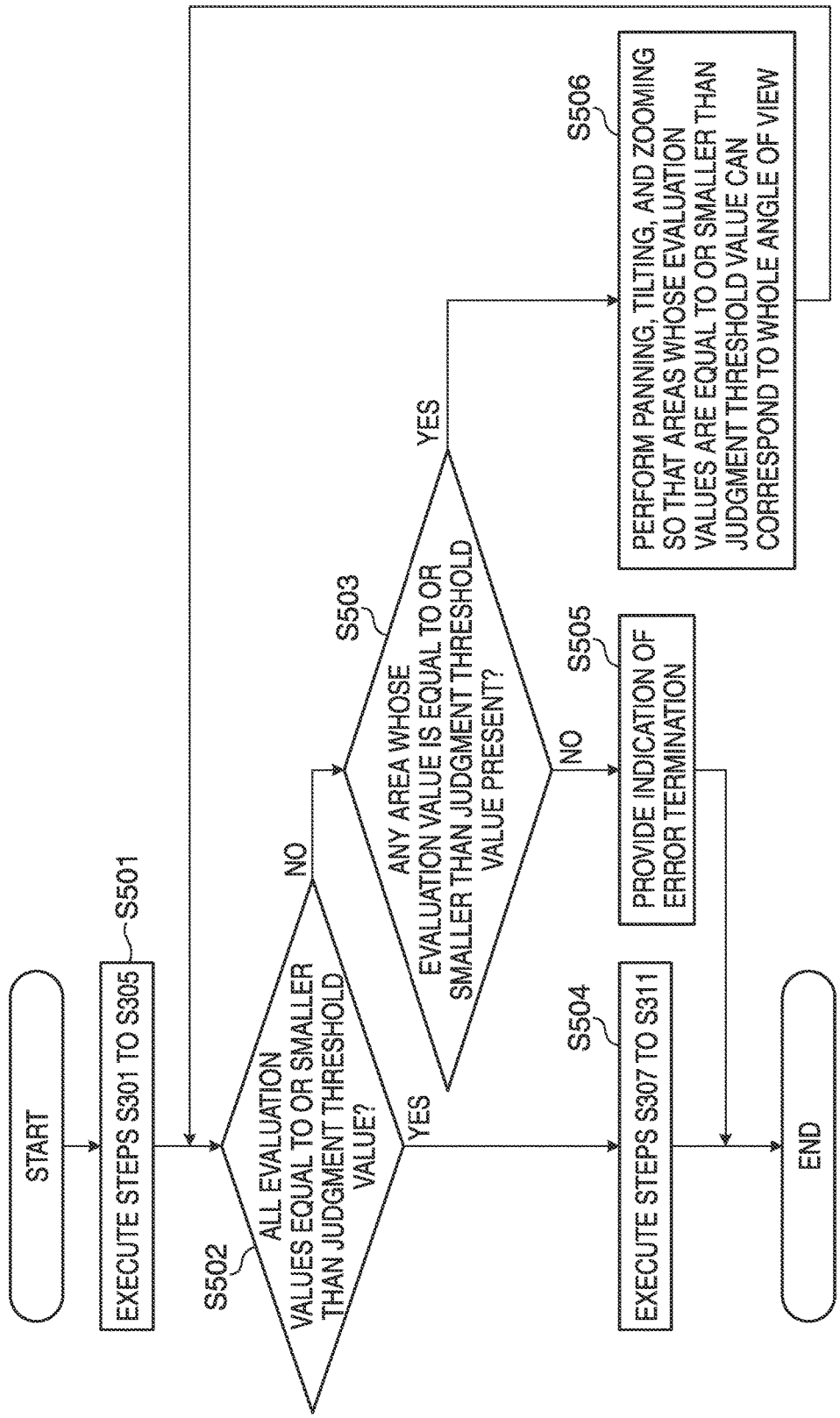
FIG. 5 is a flowchart showing the procedure of an automatic black balance adjustment process according to a second embodiment which is carried out by the video camera in FIGS. 1A to 1C.

FIG. 5 is a flowchart showing the procedure of an ABB adjustment process according to the second embodiment in the video camera 100. In the following description as well, it is assumed that this process is carried out in accordance with a user's request for ABB adjustment through menu operation (operation on the operating unit 115).

In response to an ABB adjustment executing instruction from the operating unit 115, the main body microcomputer 130 carries out, in step S501, the processes in the step S301 to S305 in FIG. 3. In step S502, the main body microcomputer 130 judges whether or not all the evaluation values are equal to or smaller than a judgment threshold value. The process of the judgment in the step S502 is the same as that in the step S306 in FIG. 3.

When the main body microcomputer 130 judges that all the evaluation values obtained in the step S305 included in the step S501 are equal to or smaller than the judgment threshold value (YES in the step S502), the process proceeds to step S504. In the step S504, the main body microcomputer 130 carries out the processes in the step S307 to S311 in FIG. 3, and after that, terminates the present process. On the other hand, when the main body microcomputer 130 judges that at least one of the evaluation values obtained in the step S305 included in the step S501 is greater than the judgment threshold value (NO in the step S502), the process proceeds to step S503. In the step S503, the main body microcomputer 130 judges whether or not there is any area with an evaluation value that is equal to or smaller than the judgment threshold value.

When the main body microcomputer 130 judges that there is no area with an evaluation value that is equal to or smaller than the judgment threshold value (evaluation values in all the evaluation frames exceed the judgement threshold value) (NO in the step S503), the process proceeds to step S505. In the step S505, the main body microcomputer 130 performs error processing in the same manner as in the step S312 in FIG. 3, and after that, terminates the present process. On the other hand, when the main body microcomputer 130 judges that there is any area with an evaluation value that is equal to or smaller than the judgment threshold value (YES in the step S503), the process proceeds to step S506. It should be noted that in the step S503, a lower limit (threshold value) may be set to the number of evaluation frames with evaluation values that are equal to or smaller than the judgment threshold value; when the number of evaluation frames with evaluation values that are equal to or smaller than the judgment threshold value is equal to or greater than the lower limit, the judgment result is positive (YES), and when not, the judgment result is negative (NO).

In the step S506, the main body microcomputer 130 changes the angle of view using the panning, tilting, and zooming functions of the video camera 100 so that evaluation values in all the evaluation frames within the angle of view can be equal to or smaller than the judgment threshold value. After that, the process returns to the step S502.

Figure 6A:
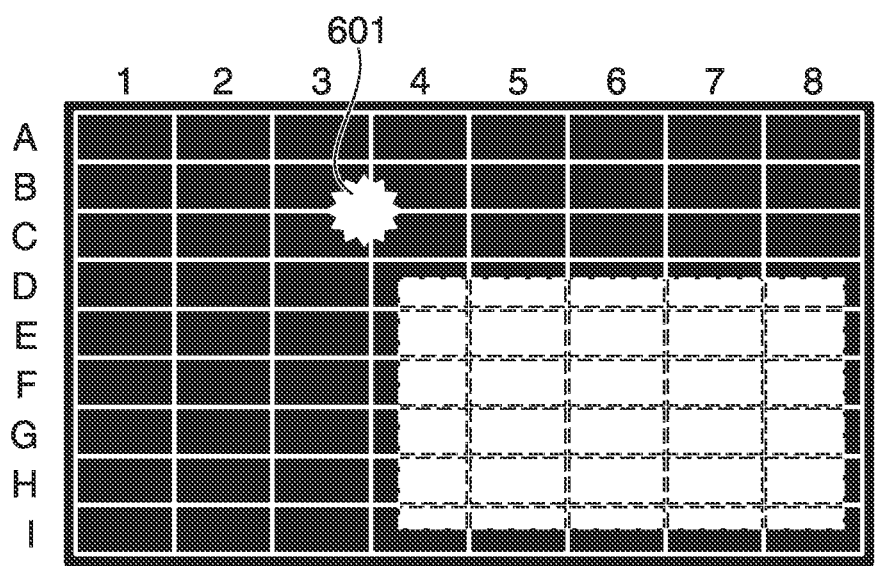
FIGS. 6A and 6B are diagrams schematically showing the relationship between evaluation frames for image pickup environment judgment before and after the angle of view is changed in step S506 in FIG. 5.
Figure 6B:
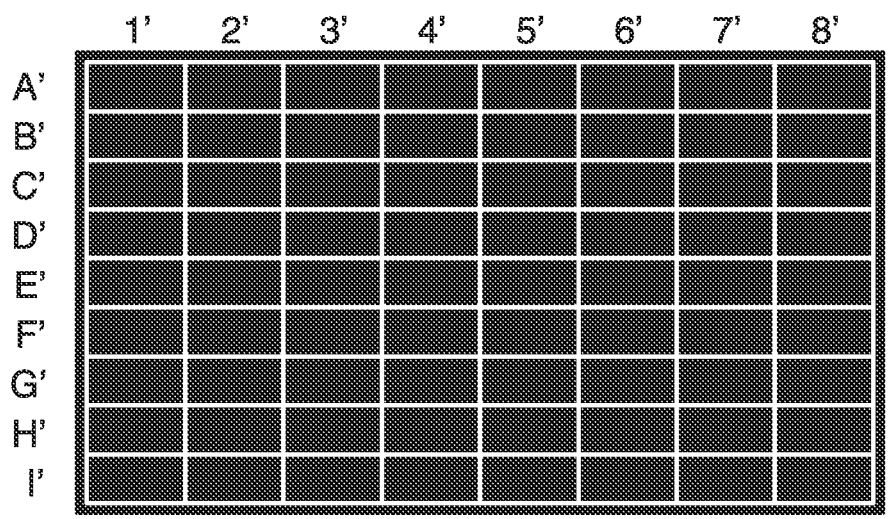

FIGS. 6A and 6B are diagrams schematically showing the relationship between evaluation frames for image pickup environment judgment before and after the angle of view is changed in the step S506, in which FIG. 6A shows a state before the angle of view is changed, and FIG. 6B shows a state after the angle of view is changed. Before the angle of view is changed, there are evaluation frames of 72 areas consisting of vertical 9 rows and horizontal 8 columns, and a light source 601 lies across evaluation frames B3, B4, C3, and C4 as with the evaluation frames shown in FIG. 4. In this case, evaluation values obtained from the evaluation frames B3, B4, C3, and C4 are greater than a judgment threshold value, whereas evaluation values obtained from evaluation frames other than the evaluation frames B3, B4, C3, and C4 are equal to or smaller than the judgment threshold value. For this reason, in the flowchart of FIG. 5, the process proceeds in the order of the steps S502, S503, and S506.

FIGS. 6A and 6B show an example in which the angle of view is changed using an area consisting of evaluation frames D4 to I8 as an area with evaluation values that are equal to or smaller than the judgment threshold value. Panning, tilting, and zooming are arbitrarily performed so that the area consisting of the evaluation frames D4 to I8 can correspond to the angle of view, and new evaluation frames A'1' to I'8' of 72 areas consisting of vertical 9 rows and horizontal 8 columns are set.

As described above, in the present embodiment as well, a threshold value of environmental light that makes ABB adjustment possible is determined based on a range over which a diaphragm of a mounted interchangeable lens is actuated and a range of density changeable by the camera main body as with the first embodiment. Based on the determined judgment threshold value, whether or not ABB adjustment is possible in the present image pickup environment is automatically judged. Further, in the present embodiment, when there is any evaluation frame with an evaluation value that is greater than the judgment threshold value, the angle of view is changed to the one which enables ABB adjustment in a state equivalent to a fully light-shielded state by arbitrary using panning, tilting, and zooming, and then ABB adjustment is done. As a result, even in a situation where it is impossible for a user to mount a body cap on the lens barrel 101, accurate ABB adjustment is possible as long as ABB adjustment is possible in the present image pickup environment. Moreover, the environment in which ABB adjustment is possible is widened as compared to the first embodiment.

In the third embodiment, when an evaluation value in an arbitrary evaluation frame is greater than a judgment threshold value, whether an object within the evaluation frame with an evaluation value that is greater than the judgment threshold value is a moving object or a stationary object is judged. When the object is a stationary object, a black image obtainment area which is an ABB adjustment area is set in an evaluation frame with an evaluation value that is equal to or smaller than the judgment threshold value, and a first ABB adjustment is made. After that, the angle of view is changed by arbitrary using panning, tilting, and zooming such that evaluation values in evaluation frames in an area where no black image has been obtained and which has not been used for the first ABB adjustment do not become greater than the judgment threshold value, and a second ABB adjustment is made. Further, a third and subsequent ABB adjustments are made in the same manner as the need arises. Thus, a plurality of ABB adjustments is made to all the evaluation frames in a plurality of times. It should be noted that among processes in the third embodiment, description of those overlapping the processes in the first embodiment described above is omitted as appropriate, and the following description focuses on processes characteristic to an ABB adjustment method according to the third embodiment.

FIG. 7 is a flowchart showing the procedure of an automatic black balance adjustment process according to the third embodiment in the video camera 100. In the following description as well, it is assumed that this process is carried out in response a user's request for ABB adjustment through menu operation (operation on the operating unit 115).

In response to an ABB adjustment executing instruction from the operating unit 115, the main body microcomputer 130 carries out, in step S701, the processes in the step S301 to S305 in FIG. 3. In step S702, the main body microcomputer 130 judges whether or not all the evaluation values are equal to or smaller than the judgment threshold value. The process of the judgment in the step S702 is the same as that in the step S306 in FIG. 3.

When the main body microcomputer 130 judges that all the evaluation values obtained in the step S305 included in the step S701 are equal to or smaller than the judgment threshold value (YES in the step S702), the process proceeds to step S704. In the step S704, the main body microcomputer 130 carries out the processes in the step S307 to S311 in FIG. 3, and after that, terminates the present process. On the other hand, when the main body microcomputer 130 judges that at least one of the evaluation values obtained in the step S305 included in the step S701 is greater than the judgment threshold value (NO in the step S702), the process proceeds to step S703.

In the step S703, the main body microcomputer 130 judges whether or not the evaluation frame with an evaluation value that is greater than the judgment threshold value moves (whether or not the position of the evaluation frame with an evaluation value that is greater than the judgment threshold value changes over time) by, for example, monitoring a plurality of and a predetermined number of frames. When the main body microcomputer 130 judges that the position of the evaluation frame with an evaluation value that is greater than the judgment threshold value changes over time (YES in the step S703), the process proceeds to step S705. Here, when it is judged that the position of the evaluation frame with an evaluation value that is greater than the judgment threshold value changes over time, there is likely to be a moving light source, and normal ABB adjustment may be impossible. Thus, in the step S705, the main body microcomputer 130 provides an indication of error termination to the effect that ABB adjustment is impossible, and after that, terminates the present process.

On the other hand, when the main body microcomputer 130 judges that the position of the evaluation frame with an evaluation value that is greater than the judgment threshold value does not change over time (NO in the step S703), the process proceeds to step S706. Here, when it is judged that the position of the evaluation frame with an evaluation value that is greater than the judgment threshold value does not change over time, there is likely to be a stationary light source, and in the present environment, ABB adjustment is likely to be possible for an area of evaluation frames with evaluation values that are equal to or smaller than the judgment threshold value. Thus, in the step S706, the main body microcomputer 130 sets, as a black image obtainment area, an area of evaluation frames with evaluation values that are equal to or smaller than the judgment threshold value and in which no black image has been obtained.

In step S707, the main body microcomputer 130 carries out the processes in the steps S307 to S310 in FIG. 3 (ABB adjustment) on the black image obtainment area set in the step S706. In step S708, the main body microcomputer 130 changes the angle of view by arbitrarily using the panning, tilting, and zooming functions such that evaluation values in the evaluation frames of the area where no image has been obtained do not become greater than the judgment threshold value. A concrete example of the process in the step S708 will be described later with reference to FIGS. 8A to 8D. After that, the process returns to the step S703, and the main body microcomputer 130 repeatedly executes the steps S703 and S706 to S708 until the processes in the steps S703 and S706 to S708 have been carried out on all the areas of evaluation frames.

Figure 8A:
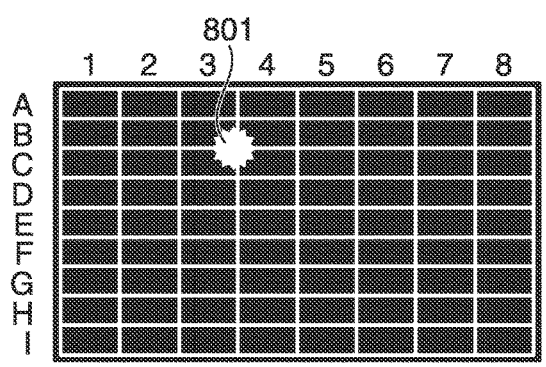
FIGS. 8A to 8D are diagrams schematically showing the relationship between a change of the angle of view in step S708 in FIG. 7 and a black image obtainment area that is set.
Figure 8B:
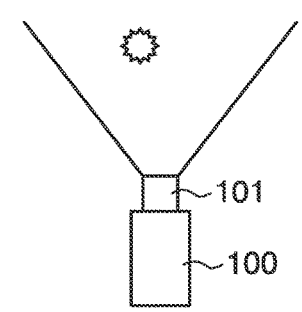

FIGS. 8A and 8B are diagrams schematically showing the relationship between change of the angle of view in the step S708 and a black image obtainment area that is set. FIG. 8A shows evaluation frames before the angle of view is changed, and FIG. 8B shows the image pickup angle of view of the camera 100 and how the camera 100 is set up (the angle at which the camera 100 is set up) before the angle of view is changed. Before the angle of view is changed, there are evaluation frames of 72 areas consisting of vertical 9 rows and horizontal 8 columns as with the evaluation frames in FIG. 4, and a light source 801 lies across evaluation frames B3, B4, C3, and C4. In this case, evaluation values obtained from the evaluation frames B3, B4, C3, and C4 are greater than a judgment threshold value, whereas evaluation values obtained from evaluation frames other than the evaluation frames B3, B4, C3, and C4 are equal to or smaller than the judgment threshold value. Thus, an area consisting of evaluation frames A5 to I8 in the right half of the whole is set as a black image detection area for a first ABB adjustment, and an ABB adjustment is made.

Figure 8C:
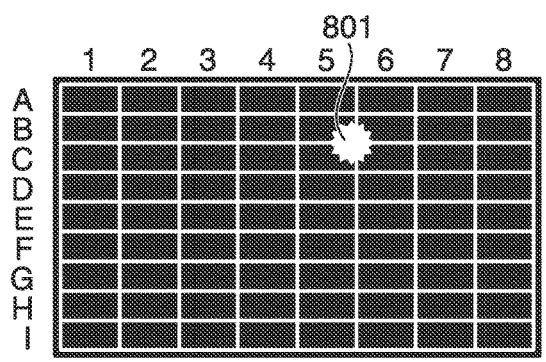
Figure 8D:
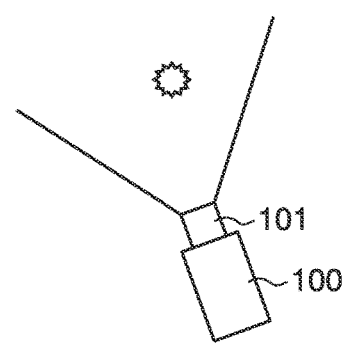

FIG. 8C shows evaluation frames after the angle of view is changed, and FIG. 8D shows the image pickup angle of view of the camera 100 and how the camera 100 is set up (the angle at which the camera 100 is set up) after the angle of view is changed. FIGS. 8C and 8D show an example in which the video camera 100 is panned leftward so that the light source 801 that has lain across the evaluation frames B3, B4, C3, and C4 can be positioned across evaluation frames B5, B6, C5, and C6 in the right half. The position of the light source 801 after the angle of view is changed is not limited to the one across the evaluation frames B5, B6, C5, and C6, but may be another position (for example, a position across evaluation frames F6 and G6).

As a result, evaluation values in evaluation frames in an area consisting of evaluation frames A1 to I4 in the left half, which have not been used in the first ABB adjustment, are changed to those not greater than the judgment threshold value, and therefore, the area consisting of the evaluation frames A1 to I4 is set as a black image detection area for a second ABB adjustment, and an ABB adjustment is made. By combining detection results obtained by the two ABB adjustments thus made, image correction data is generated for all the pixels of the image pickup device 102.

It should be noted that the number of times a black image detection area is set and an ABB adjustment is made is not limited to two. For example, when there is a plurality of light sources, and it is possible to obtain image correction data for all the pixels of the image pickup device 102 by setting a black image detection area and making an ABB adjustment three times or more, the process in the steps S703 and S706 to S708 should be carried out the same number of times.

As described above, in the present embodiment, a threshold value of environmental light that makes ABB adjustment possible is determined based on a range over which a diaphragm of a mounted interchangeable lens is actuated and a range of density changeable by the camera main body. Then, based on the determined judgment threshold value, whether or not ABB adjustment is possible in the present image pickup environment is automatically judged. Further, when there is any evaluation frame with an evaluation value that is greater than the judgment threshold value, whether or not an object lying in the evaluation frame with an evaluation value that is greater than the judgment threshold value is a moving object or a stationary object is judged, and when the object is a stationary one, an area of the evaluation frame with an evaluation value that is equal to or smaller than the judgment threshold value is set as a black image obtainment area, and a first ABB adjustment is made. After that, the angle of view is changed by arbitrarily using the panning, tilting, and zooming functions such that evaluation values in evaluation frames in which no black image has been obtained in the first ABB adjustment do not become greater than the judgment threshold value, and a second ABB adjustment is made. Since a plurality of ABB adjustments are thus made for all the areas of evaluation frames, ABB adjustments are correctly made as long as ABB adjustment is possible in the present image pickup environment even in a situation where it is impossible for a user to mount a body cap on the lens barrel 101. Moreover, the environment in which ABB adjustment is possible is widened as compared to the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-066655, filed Mar. 27, 2015 which is hereby incorporated by reference wherein in its entirety.

What is claimed is:

1. An image pickup apparatus comprising:
    an image pickup unit configured to pick up an image of a subject;
    a first adjustment unit configured to adjust an amount of light incident on said image pickup unit;
    a second adjustment unit configured to be provided separately from said first adjustment unit and adjust an amount of light incident on said image pickup unit;
    a judgment unit configured to judge whether an image pickup environment is dark to the extent that automatic adjustment of black balance is possible, based on evaluation values of a picked-up image obtained in a state where the amounts of incident light are maximized by respective ones of said first adjustment unit and said second adjustment unit, and a predetermined judgment threshold value;
    a determination unit configured to determine the judgment threshold value based on a range over which the amount of incident light is adjustable by said first adjustment unit and a range over which the amount of incident light is adjustable by said second adjustment unit; and
    a generation unit configured to, when said judgment unit judges that the automatic adjustment is possible in a state in which the image pickup environment is sufficiently dark, generate image correction data for adjusting black balance in a state where the amounts of incident light are minimized by respective ones of said first adjustment unit and said second adjustment unit.

2. The image pickup apparatus according to claim 1, wherein said judgment unit divides the picked-up image into a plurality of areas, and when all the evaluation values in the respective ones of the plurality of areas are not greater than the judgment threshold value, said judgment unit judges that the automatic adjustment is possible.

3. The image pickup apparatus according to claim 2, further comprising a changing unit configured to change an angle of view, at which said image pickup unit picks up an image, by at least one of panning, tilting, and zooming,
    wherein said changing unit changes the angle of view such that evaluation values in all areas within the angle of view do not become greater than the judgment threshold value when said judgment unit judges that an evaluation value in at least one among the plurality of areas is greater than the judgment threshold value, and
    said generation unit generates the image correction data in an area after the angle of view is changed by said changing unit.

4. The image pickup apparatus according to claim 2, further comprising a monitoring unit configured to, when said judgment unit judges that an evaluation value in at least one among the plurality of areas is greater than the judgment threshold value, monitor whether the area with an evaluation value that is greater than the judgment threshold value moves,
    wherein said judgment unit does not make the automatic adjustment when said monitoring unit judges that the area with an evaluation value that is greater than the judgment threshold value moves, and said judgment unit makes the automatic adjustment when said monitoring unit judges that the area with an evaluation value that is greater than the judgment threshold value does not move.

5. The image pickup apparatus according to claim 1, wherein said first adjustment unit includes at least a diaphragm provided in a lens barrel which the image pickup apparatus has.

6. The image pickup apparatus according to claim 1, wherein said second adjustment unit is a neutral density filter or an electro chromic device.

7. A control method for an image pickup apparatus that automatically adjusts black balance, the image pickup apparatus having an image pickup unit that picks up an image of a subject, and a first adjustment unit and a second adjustment unit that adjust an amount of light incident on the image pickup unit, the control method comprising:
    a determination step of, based on ranges over which amounts of light incident on an image pickup unit that picks up an image of a subject are adjustable by respective ones of a first adjustment unit and a second adjustment unit that adjust the amounts of light incident on the image pickup unit, determining a judgment threshold value for use in judging whether the automatic adjustment is possible in a present image pickup environment;
    an image pickup step of picking up an image using the image pickup unit in a state where the amounts of incident light are maximized by respective ones of the first adjustment unit and the second adjustment unit;
    a judgment step of judging whether an image pickup environment is dark to the extent that the automatic adjustment is possible, based on evaluation values of an picked-up image obtained in said image pickup step and the judgment threshold value determined in said determination step; and
    a generation step of, when it is judged in said judgment step that the automatic adjustment is possible in a state in which the image pickup environment is sufficiently dark, picking up an image using the image pickup unit in a state where the amounts of incident light are minimized by respective ones of the first adjustment unit and the second adjustment unit, and based on the picked-up image thus obtained, generating image correction data for adjusting black balance for the automatic adjustment.

8. A non-transitory computer-readable storage medium storing a program for causing a computer to execute a control method for an image pickup apparatus that automatically adjusts black balance, the image pickup apparatus having an image pickup unit that picks up an image of a subject, and a first adjustment unit and a second adjustment unit that adjust an amount of light incident on the image pickup unit, the control method for the image pickup apparatus comprising:

a determination step of, based on ranges over which amounts of light incident on an image pickup unit that picks up an image of a subject are adjustable by respective ones of a first adjustment unit and a second adjustment unit that adjust the amounts of light incident on the image pickup unit, determining a judgment threshold value for use in judging whether the automatic adjustment is possible in a present image pickup environment;

an image pickup step of picking up an image using the image pickup unit in a state where the amounts of incident light are maximized by respective ones of the first adjustment unit and the second adjustment unit;

a judgment step of judging whether an image pickup environment is dark to the extent that the automatic adjustment is possible, based on evaluation values of an picked-up image obtained in said image pickup step and the judgment threshold value determined in said determination step; and a generation step of, when it is judged in said judgment step that the automatic adjustment is possible in a state in which the image pickup environment is sufficiently dark, picking up an image using the image pickup unit in a state where the amounts of incident light are minimized by respective ones of the first adjustment unit and the second adjustment unit, and based on the picked-up image thus obtained, generating image correction data for adjusting black balance for the automatic adjustment.

9. An image pickup apparatus comprising:
an image pickup device configured to pick up an image of a subject; and
one or more processors configured to implement a first adjustment unit, a second adjustment unit, a judgement unit, a determination unit and a generation unit, wherein:
said first adjustment unit is configured to adjust an amount of light incident on said image pickup unit,
said second adjustment unit is configured to be provided separately from said first adjustment unit and adjust an amount of light incident on said image pickup unit,
said judgment unit is configured to judge whether an image pickup environment is dark to the extent that automatic adjustment of black balance is possible, based on evaluation values of a picked-up image obtained in a state where the amounts of incident light are adjusted to a first amount by respective ones of said first adjustment unit and said second adjustment unit, and a predetermined judgment threshold value,
said determination unit is configured to determine the judgment threshold value based on a range over which the amount of incident light is adjustable by said first adjustment unit and a range over which the amount of incident light is adjustable by said second adjustment unit; and
said generation unit is configured to, when said judgment unit judges that the automatic adjustment is possible in a state in which the image pickup environment is sufficiently dark, generate image correction data for adjusting black balance in a state where the amounts of incident light are adjusted to a second amount smaller than the first amount by respective ones of said first adjustment unit and said second adjustment unit.

10. The image pickup apparatus according to claim 9, wherein said judgment unit divides the picked-up image into a plurality of areas, and when all the evaluation values in the respective ones of the plurality of areas are not greater than the judgment threshold value, said judgment unit judges that the automatic adjustment is possible.

11. The image pickup apparatus according to claim 9, wherein said first adjustment unit includes at least a diaphragm provided in a lens barrel which the image pickup apparatus has.

12. The image pickup apparatus according to claim 9, wherein said second adjustment unit is a neutral filter or an electro chromatic device.

* * * * *